United States Patent [19]

Akasaki et al.

[11] Patent Number: 5,139,908

[45] Date of Patent: Aug. 18, 1992

[54] ELECTROPHOTOGRAPHIC PHOTORECEPTOR WITH BROMINE OR CHLORINE CONTAINING POLYCARBONATE

[75] Inventors: Yutaka Akasaki; Katsuhiro Sato; Susumu Honma; Hiroyuki Tanaka; Katsumi Nukada, all of Minami-Ashigara, Japan

[73] Assignee: Fuji Xerox Co., Ltd., Tokyo, Japan

[21] Appl. No.: 466,919

[22] Filed: Jan. 18, 1990

[30] Foreign Application Priority Data

Jan. 19, 1989 [JP] Japan .................. 1-008481

[51] Int. Cl.$^5$ .......................................... G03G 5/047
[52] U.S. Cl. .................................... 430/58; 430/59
[58] Field of Search ................................. 430/58, 59

[56] References Cited

U.S. PATENT DOCUMENTS

| | | | |
|---|---|---|---|
| 3,484,237 | 12/1969 | Shattuck et al. | 430/80 |
| 4,030,923 | 6/1977 | Krause et al. | 430/58 |
| 4,232,103 | 11/1980 | Limburg et al. | 430/58 X |
| 4,352,847 | 10/1982 | Okiyama | 430/950 X |
| 5,034,295 | 7/1991 | Allen et al. | 430/58 |
| 5,039,584 | 8/1991 | Odell et al. | 430/59 X |

Primary Examiner—Roland Martin
Attorney, Agent, or Firm—Finnegan, Henderson, Farabow, Garrett and Dunner

[57] ABSTRACT

An electrophotographic photoreceptor comprising a conductive support having thereon a photosensitive layer is disclosed, wherein a charge transport layer constituting said photosensitive layer or a protective layer formed on said photosensitive layer contains a charge transporting agent, said charge transporting agent being dissolved in a solid state or dispersed in a polycarbonate resin containing a monomer unit represented by formula (I):

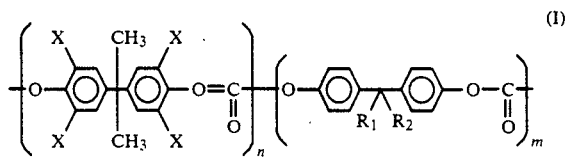

wherein $R_1$ represents a hydrogen atom, a methyl group, a cyano group, or a phenyl group; $R_2$ represents a methyl group, a cyano group, or a phenyl group; or $R_1$ and $R_2$ are connected to each other to form a 5- or 6-membered saturated ring; X represents a chlorine atom or a bromine atom; n represents an integer; and m represents 0 or an integer.

The photoreceptor exhibits high sensitivity with low residual potential.

7 Claims, No Drawings

ELECTROPHOTOGRAPHIC PHOTORECEPTOR WITH BROMINE OR CHLORINE CONTAINING POLYCARBONATE

FIELD OF THE INVENTION

This invention relates to a highly sensitive positively or negatively chargeable electrophotographic photoreceptor.

BACKGROUND OF THE INVENTION

Conventional electrophotographic photoreceptors include those having a single photoconductive layer and those having a laminated type photoconductive layer. Various proposals have recently been made particularly on organic electrophotographic photoreceptors comprising a charge transporting layer and a charge generating layer as a separate function type photoconductive layer in which an organic photoconductive substance is bound with a resin, etc. In this connection, various electron transporting agents to be used in the electron transporting layer have also been developed. Further, with respect to a matrix for the charge transporting agent, it has been proposed to stabilize the charge transporting agent by donor doping or by using polyvinylcarbazole, or to dissolve the transporting agent in various binder resins. For example, a polycarbonate matrix or polyester matrix is described, e.g., in JP-A-61-233750, JP-A-61-225151, JP-A-61-148159, JP-A-61-143764, JP-A-52-2436, JP-A-53-20930, JP-A-49-91-648, JP-A-61-103862, JP-A-60-222477, and U.S. Pat. No. 3,484,237 (the term "JP-A" as used herein means an "unexamined published Japanese patent application").

However, the so far proposed electrophotographic photoreceptors having a charge transporting agent-containing charge transporting layer are still unsatisfactory in sensitivity, particularly when applied as a positively chargeable photoreceptor.

SUMMARY OF THE INVENTION

An object of this invention is to provide a highly sensitive positively or negatively chargeable electrophotographic photoreceptor.

Another object of this invention is to provide a laminated type electrophotographic photoreceptor having a charge generating layer and a charge transporting layer containing a charge transporting agent.

The present invention relates to an electrophotographic photoreceptor comprising a conductive support having thereon a photosensitive layer, wherein a charge transporting layer constituting the photosensitive layer or a protective layer formed on the photosensitive layer contains a charge transporting agent, the charge transporting agent being dissolved or dispersed in a polycarbonate resin containing a monomer unit represented by formula (I):

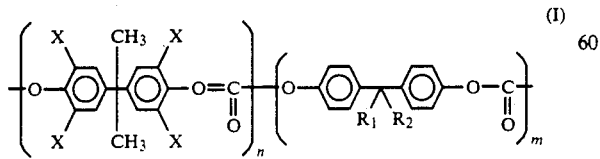

wherein $R_1$ represents a hydrogen atom, a methyl group, a cyano group, or a phenyl group; $R_2$ represents a methyl group, a cyano group, or a phenyl group; or $R_1$ and $R_2$ are connected to each other to form a 5- or 6-membered saturated ring; X represents a chlorine atom or a bromine atom; n represents an integer; and m represents 0 or an integer.

DETAILED DESCRIPTION OF THE INVENTION

For the sake of convenience, the present invention will be described by referring to an electrophotographic photoreceptor having a laminated structure of a charge generating layer and a charge transporting layer.

The conductive support which can be used in this invention includes a metal pipe, a metal plate, a metal sheet, a metal foil, a high polymer film having been rendered electrically conductive, a high polymer film having a layer deposited with metal (e.g., aluminum), and a high polymer film or paper coated with a metal oxide (e.g., $SnO_2$) or a quaternary ammonium salt, etc.

The charge generating layer which is formed on the conductive support includes a deposited film formed by vacuum deposition of a charge generating agent, e.g., a-Se, a-Si, $As_2Se_3$, and SeTe; and a coating film formed by coating a composition mainly comprising a charge generating agent and a binder resin. Any of known charge generating agents and binder resins can be employed. Examples of suitable charge generating agents include inorganic semiconductors, e.g., trigonal selenium, bisazo compounds, trisazo compounds, phthalocyanine compounds, pyrylium compounds, squaraine pigments, and organic pigments, e.g., anthrone pigments, perylene pigments, and phthalocyanine pigments. Examples of suitable binder resins include polystyrene, silicone resins, polycarbonate resins, acrylic resins, methacrylic resins, polyester resins, vinyl polymer resins, cellulose resins, and alkyd resins.

The charge generating layer usually has a thickness of from about 0.05 to 10 μm.

On the charge generating layer is provided a charge transporting layer where a charge transporting agent is incorporated. The charge transporting agent includes electron transporting agents, positive hole transporting agents, and mixtures thereof. Examples of suitable electron transporting agents ar shown below.

Fluorenone Compounds:

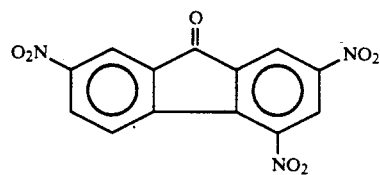
(2-1)

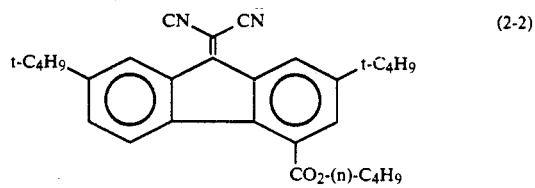
(2-2)

-continued
(2-3) 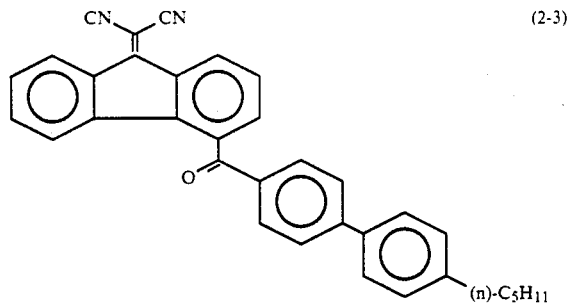
(2-4) 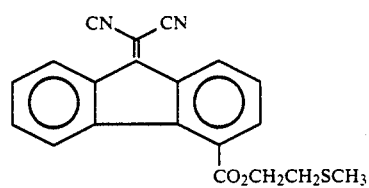
(2-5) 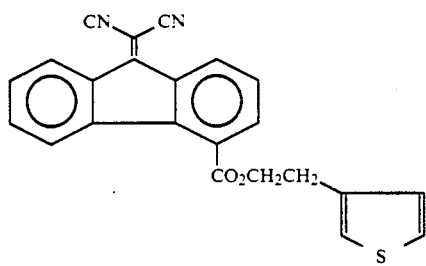
(2-6) 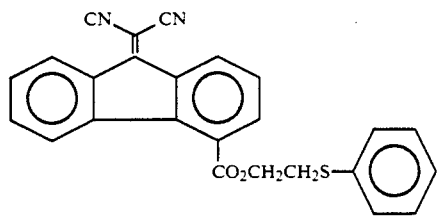
(2-7) 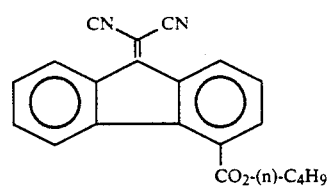
(2-8) 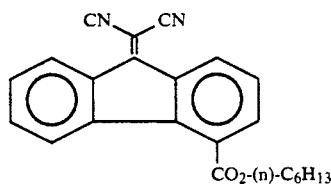
(2-9) 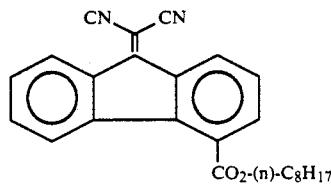
-continued
(2-10) 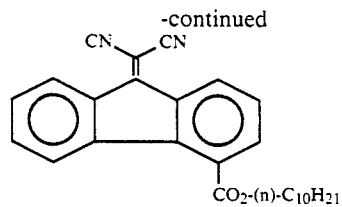
(2-11) 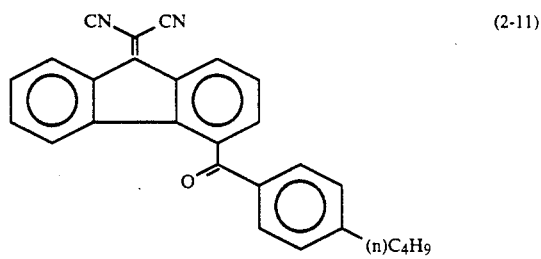
Benzophenone Compounds:
(2-12) 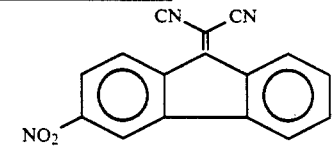
(2-13) 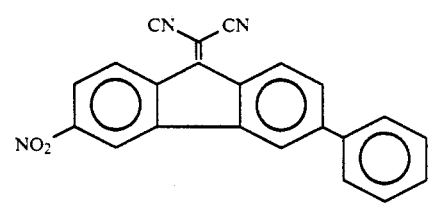
(2-14) 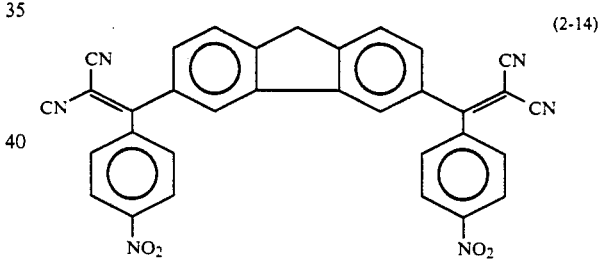
Anthraquinone Compounds:
(2-15) 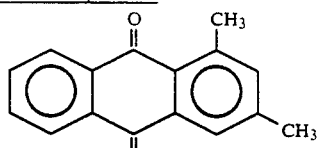
(2-16) 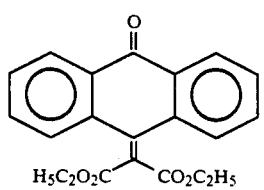
(2-17) 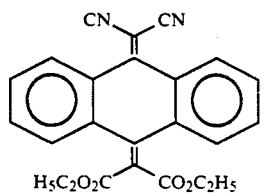

-continued
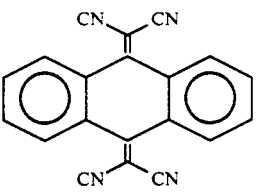 (2-18)
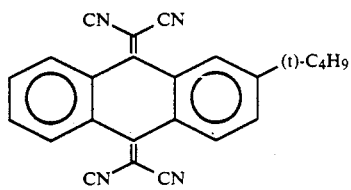 (2-19)
Benzoquinone Compounds:
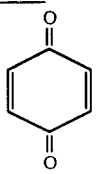 (2-20)
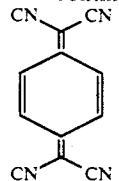 (2-21)
4H-Thiopyran 1,1-Dioxide Compounds:
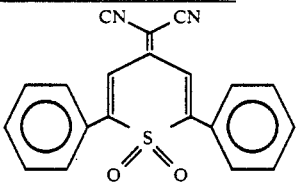 (2-22)
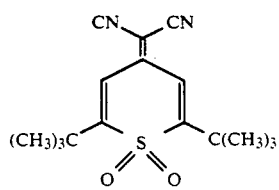 (2-23)
Examples of suitable positive hole transporting agents are shown below.
Tetraarylbenzidine Compounds:
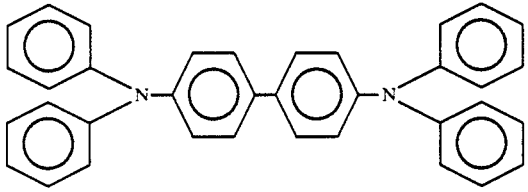 (3-1)
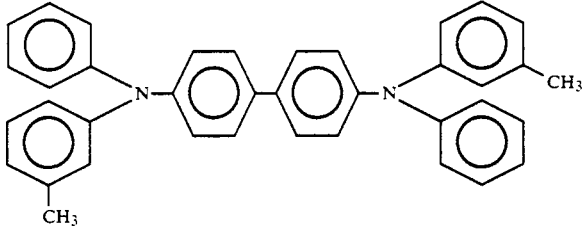 (3-2)
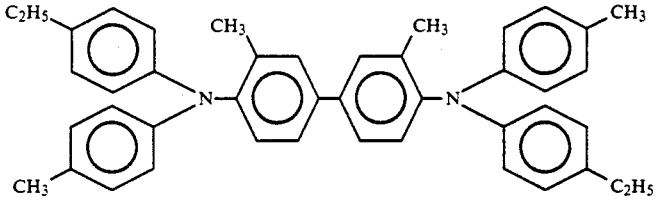 (3-3)
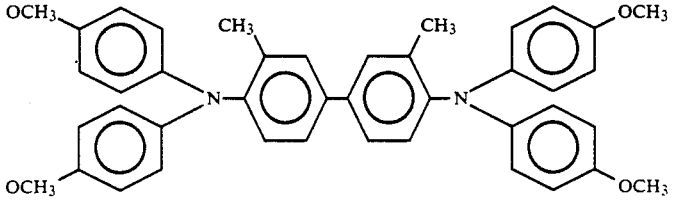 (3-4)

-continued
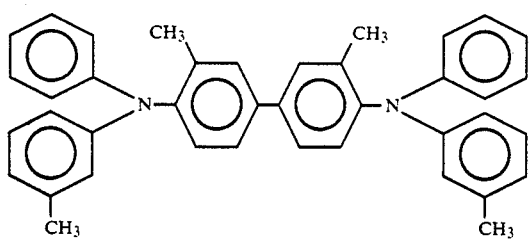 (3-5)
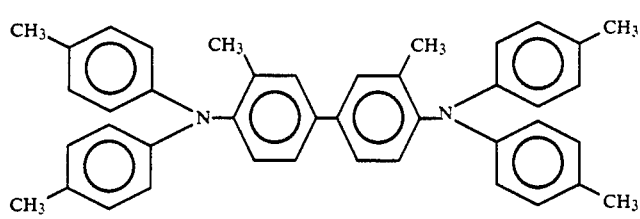 (3-6)
Triarylamine Compounds:
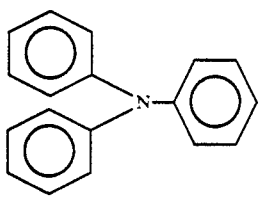 (3-7)
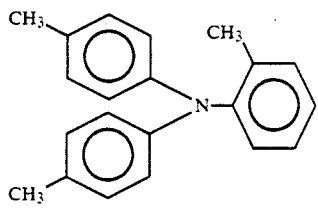 (3-8)
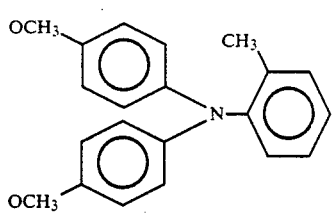 (3-9)
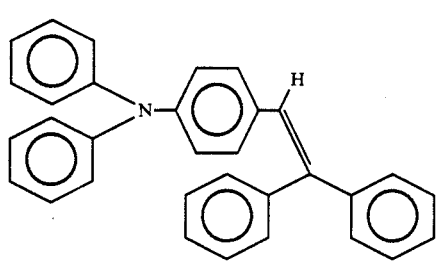 (3-10)
Hydrazone Compounds:

(3-11)

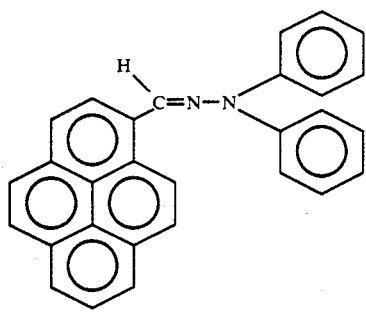

The charge transporting agent is dissolved or dispersed in the polycarbonate resin containing a monomer unit of formula (I) to form a charge transporting layer. The charge transporting layer usually has a thickness of from about 2 to 100 μm.

The surface protective layer usually has a thickness of from 0.5 to 10 μm, preferably from 1 to 5 μm.

In the polycarbonate resin represented by formula (I), n preferably ranges from 30 to 300, and m preferably ranges from 0 to 300. The polycarbonate resin preferably has a weight average molecular weight of from 15,000 to 200,000, and more preferably from 20,000 to 120,000. Further, in the formula (I), $R_1$ and $R_2$ each preferably represents a methyl group or a phenyl group.

Specific examples of polycarbonate resins which can be used in the present invention are shown below.

Compound I-1:

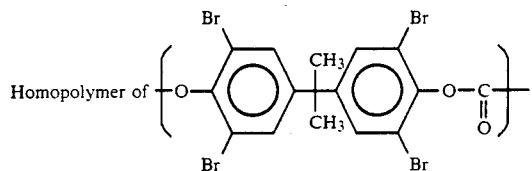

Compound I-2:

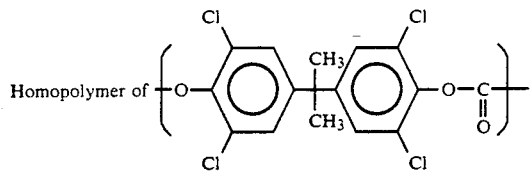

Compound I-3:

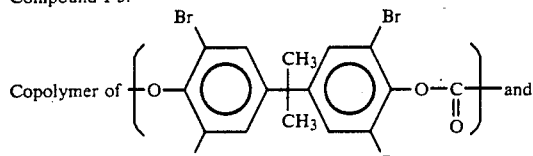

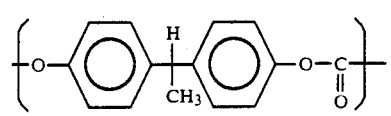

Compound I-4:

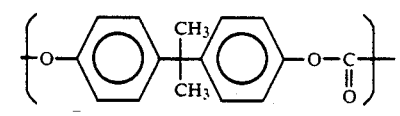

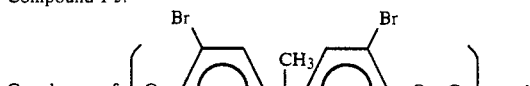

Compound I-5:

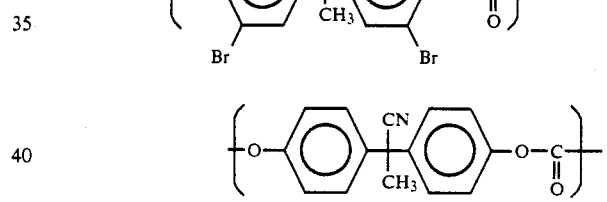

Compound I-6:

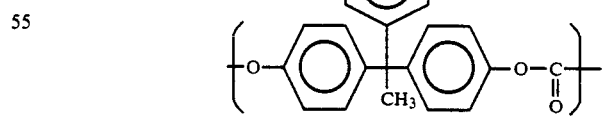

Compound I-7:

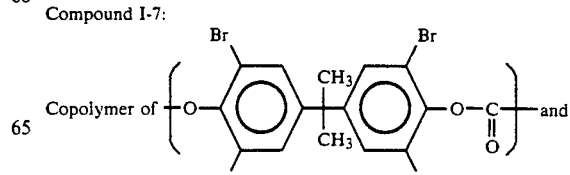

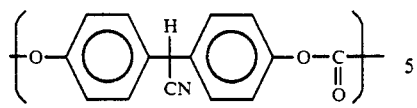
Compound I-8:
Copolymer of 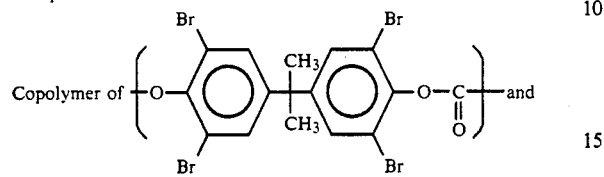 and
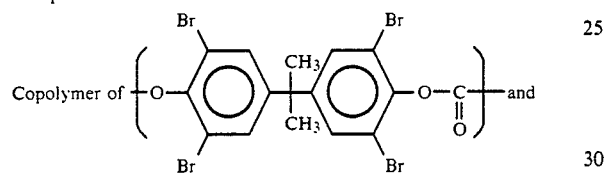
Compound I-9:
Copolymer of 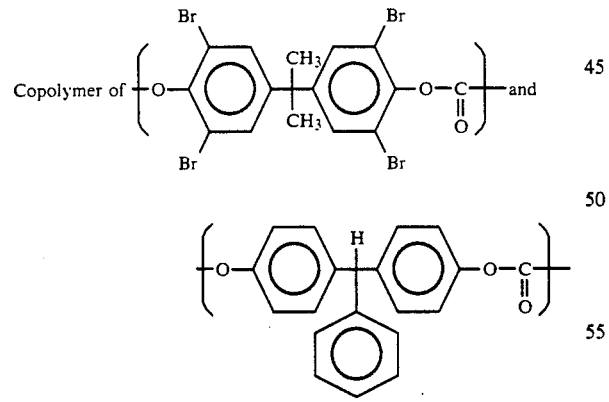
Compound I-10:
Copolymer of 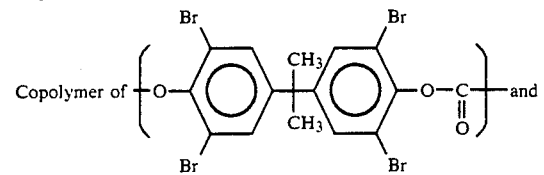 and
Copolymer I-11:
Copolymer of 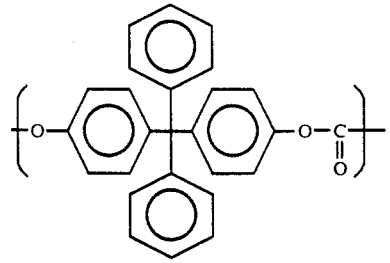
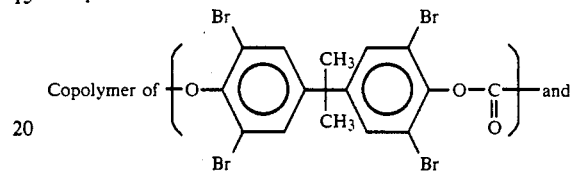
Compound I-12:
Copolymer of 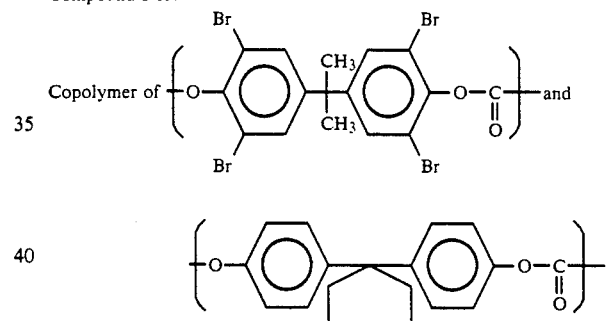
Compound I-13:
Copolymer of 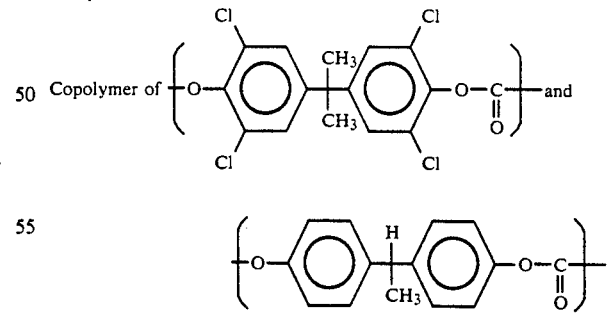
Compound I-14:
Copolymer of 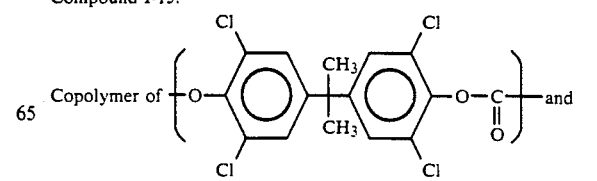 and
Compound I-15:
Copolymer of

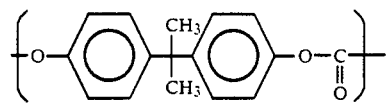
Compound I-16:
Copolymer of 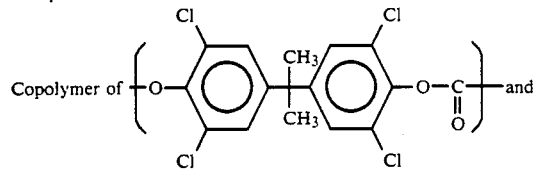 and
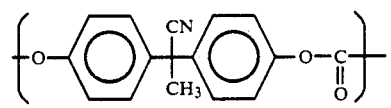
Compound I-17:
Copolymer of 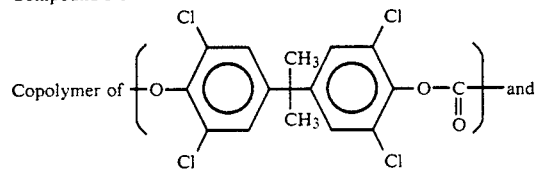 and
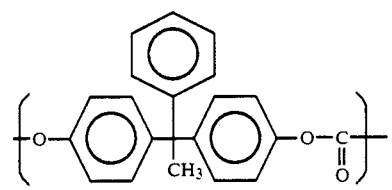
Compound I-18:
Copolymer of 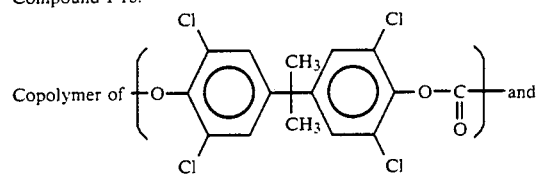 and
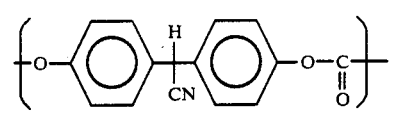
Compound I-19:
Copolymer of 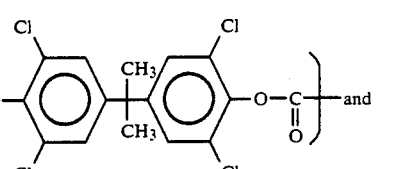 and
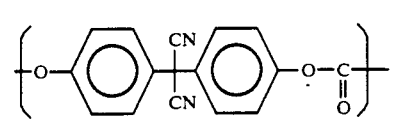
Compound I-20:
Copolymer of 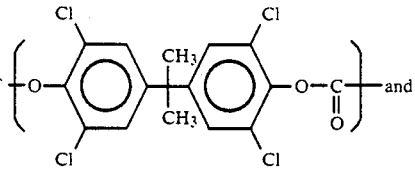 and
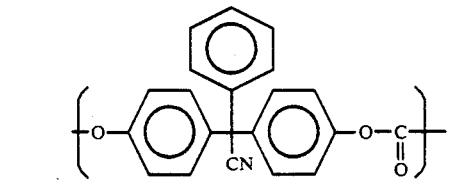
Compound I-21:
Copolymer of 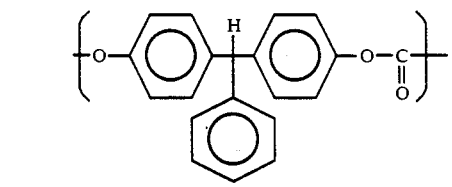 and
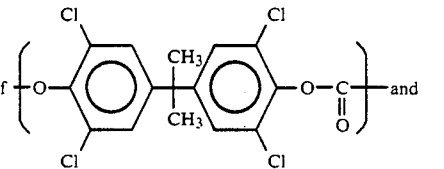
Compound I-22:
Copolymer of 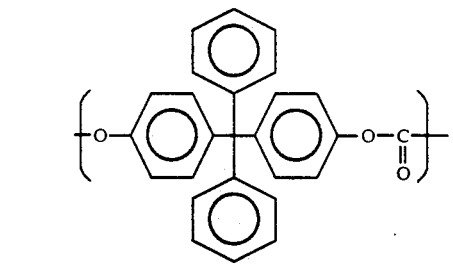 and
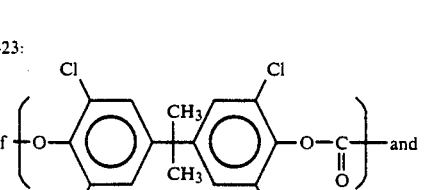
Compound I-23:
Copolymer of 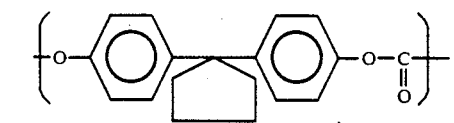 and -continued Compound I-24:

Copolymer of 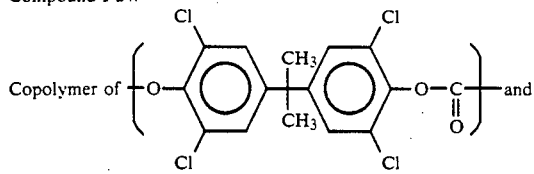

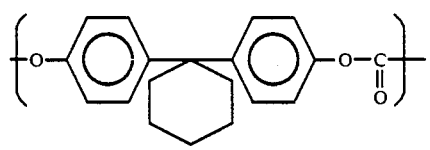

Among these compound examples, Compounds I-1, I-2, I-4, I6, I-11, I-13, I-15, I-17, I-22 and I-24 are particularly preferred.

A weight mixing ratio of the charge transporting agent to the polycarbonate resin of formula (I) in the charge transporting layer or surface protective layer ranges from 1:20 to 20:1 by weight, and preferably from 1:5 to 6:4 by weight.

If desired, the charge transporting layer or surface protective layer according to the present invention may further contain other known binder resins.

Further, solvents for the charge transporting agents or binders, such as methylene chloride may be used in the present invention.

The present invention is now illustrated in greater detail with reference to Examples, but it should be understood that the present invention is not deemed to be limited thereto.

EXAMPLE 1

On an aluminum support was formed a 2.5 μm thick charge generating layer comprising trigonal selenium/polyvinylcarbazole (trigonal selenium content: 7% by volume) in a usual manner.

In 5.8 g of methylene chloride were dissolved 0.75 g of Compound I-1 (weight average molecular weight: 28,000; produced by Mitsubishi Gas Chemical Ind., Ltd.), 0.5 g of Compound 2-7, and 0.2 g of Compound 3-2, and the resulting composition was coated on the charge generating layer to a wet thickness of 5 mil and dried at 80° C. for 2 hours to obtain an electrophotographic photoreceptor (designated Sample 1).

EXAMPLES 2 TO 7

Electrophotographic photoreceptors (designated Samples 2 to 7) were prepared in the same manner as in Example 1, except for replacing Compound 2-7 with Compounds 2-1, 2-9, 2-11, 2-3, 2-13, and 2-2, respectively, in the same amount.

EXAMPLES 8 TO 10

Electrophotographic photoreceptors (designated Samples 8 to 10) were prepared in the same manner as in Example 1, except for replacing Compound I-1 with Compounds I-3 (m:n=1:1; average molecular weight: 31,000), I-2 (average molecular weight: 35,000), and I-13 (m:n=1:1; average molecular weight: 27,000), respectively, in the same amount.

COMPARATIVE EXAMPLES 1 TO 5

Electrophotographic photoreceptors (designated Samples 11 to 15) were prepared in the same manner as in Examples 1 to 5, respectively, except for replacing Compound I-1 with the same amount of a polycarbonate resin comprising a monomer unit shown below ("Makrolon 5705" produced by Farbenfabriken Bayer A.G.) and changing the amount of methylene chloride to 7 g. Monomer Unit:

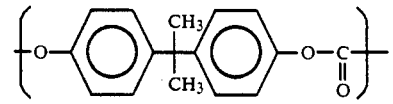

COMPARATIVE EXAMPLES 6 AND 7

Electrophotographic photoreceptor (designated Samples 16 and 17) were prepared in the same manner as in Examples 6 and 7, respectively, except for replacing Compound I—1 with the same amount of a polycarbonate resin comprising a monomer unit shown below (weight average molecular weight: 21,000; produced by Mitsubishi Gas Chemical Ind., Ltd.).

Monomer Unit:

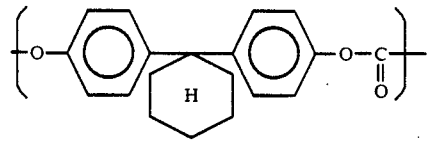

Each of the resulting electrophotographic photoreceptors (Samples 1 to 15) was evaluated for performance characteristics using an electrostatic copying paper testing machine ("SP-428" manufactured by Kawaguchi Denki Seisakusho) as follows.

The sample was positively charged to +6 kV by corona discharge and allowed to stand in a dark place for 2 seconds. The initial surface potential $V_0$ was measured. Then, the sample was exposed to light emitted from a tungsten lamp (5 lux), and the rate of light decay dV/dt was obtained. The surface potential on exposure for 10 seconds $V_{RP}$ was also measured. The results obtained are shown in Table 1 below.

TABLE 1

| Sample No. | $V_0$ (V) | dV/dt (V·sec$^{-1}$) | $V_{RP}$ (V) | Remarks |
|---|---|---|---|---|
| 1 | +1035 | 2530 | +210 | Invention |
| 2 | +970 | 115 | +630 | " |
| 3 | +985 | 2405 | +245 | " |
| 4 | +930 | 2205 | +280 | " |
| 5 | +1015 | 2025 | +315 | " |
| 6 | +960 | 1530 | +445 | " |
| 7 | +975 | 1665 | +420 | " |
| 8 | +1015 | 2320 | +285 | " |
| 9 | +1005 | 2350 | +240 | " |
| 10 | +1055 | 2410 | +230 | " |
| 11 | +1015 | 2150 | +340 | Comparison |
| 12 | +1030 | 85 | +740 | " |
| 13 | +960 | 2005 | +355 | " |
| 14 | +1035 | 1955 | +360 | " |
| 15 | +1000 | 1740 | +405 | " |
| 16 | +985 | 1295 | +525 | " |
| 17 | +1055 | 1310 | +490 | " |

As is clear from the results of Table 1, Sample Nos. 1-10 according to the present invention show high initial sensitivity (dV/dt) and low residual potential ($V_{RP}$).

EXAMPLE 11

In 10 g of methylene chloride were dissolved 0.75 g of Compound I-1 (weight average molecular weight: 28,000; produced by Mitsubishi Gas Chemical Ind., Ltd.), 0.5 g of Compound 2-7, and 0.2 g of Compound 3-2 to prepare a coating composition.

On an aluminum support was vacuum deposited a seleniumarsenide alloy comprising 99.5% of Se and having been doped with 100 ppm of chlorine to a thickness of 62 μm to form a photoconductive layer. The above prepared coating composition was coated on the photoconductive layer to form a 2.5 μm thick overcoat layer to obtain an electrophotographic photoreceptor.

COMPARATIVE EXAMPLE 8

An electrophotographic photoreceptor was prepared in the same manner as in Example 11, except that the overcoat layer was not formed.

COMPARATIVE EXAMPLE 9

An electrophotographic photoreceptor was prepared in the same manner as in Example 11, except for replacing Compound I-1 with the same polycarbonate resin as used in Comparative Example 1 in the same amount.

Each of the photoreceptors obtained in Example 11 and Comparative Examples 8 and 9 was evaluated in the same manner as in Example 1 to determine the initial surface potential ($V_0$), the surface potential after 10 seconds' exposure ($V_{RF}$) and, in addition, the half decay sensitivity either in the initial stage and after 1000 cycles. The results obtained are shown in Table 2 below.

TABLE 2

| Example No. | Initial Stage | | | After 1,000 cycles | | |
|---|---|---|---|---|---|---|
| | $V_0$ (V) | Half-Decay Sensitivity | $V_{RP}$ (V) | $V_0$ (V) | Half-Decay Sensitivity | $V_{RP}$ (V) |
| Example 11 | 1020 | 12.1 | 105 | 1020 | 12.1 | 105 |
| Comparative Example 8 | 1015 | 12.0 | 100 | 1020 | 12.1 | 105 |
| Comparative Example 9 | 1030 | 12.5 | 120 | 1035 | 12.8 | 135 |

As is clear from the results of Table 2, Sample No. 11 according to the present invention which contains the polycarbonate resin in the overcoat layer show high sensitivity and $V_{RP}$.

EXAMPLE 12

A solution prepared by dissolving 0.75 g of Compound I—1 (weight-average molecular weight: 28,000; produced by Mitsubishi Gas Chemical Ind., Ltd.) and 0.75 g of Compound 3-2 in 6.0 g of methylene chloride was coated on a charge generating layer prepared in the same manner as in Example 1 to a wet thickness of 5 mil and dried at 80° C. for 29 hours to prepare an electrophotographic photoreceptor.

EXAMPLE 13

An electrophotographic photoreceptor was prepared in the same manner as in Example 12, except for replacing Compound 3—2 with Compound 3—3 in the same amount.

EXAMPLE 14

An electrophotographic photoreceptor was prepared in the same manner as in Example 12, except for replacing Compound 3—4 with Compound 3—3 in the same amount.

EXAMPLE 15

An electrophotographic photoreceptor was prepared in the same manner as in Example 12, except for replacing Compound I-1 with Compound I-2 in the same amount.

EXAMPLE 16

An electrophotographic photoreceptor was prepared in the same manner as in Example 12, except for replacing Compound I-1 with Compound I-4 in the sam amount.

Each of the photoreceptors obtained in Examples 12 to 16 was evaluated for performance characteristics as follows by means of the same testing machine as used in Example 1. Each sample was negatively charged to −6 kV by corona discharge and allowed to stand in a dark place for 2 seconds to measure the initial surface potential V. Then, the sample was exposed to light of a tungsten lamp (5 lux), and the rate of light decay dV/dt was obtained. Further, the surface potential after exposure for 10 seconds was also measured. The results obtained are shown in Table 3 below.

TABLE 3

| Example No. | $V_0$ (V) | dV/dt (V · sec.$^{-1}$) | $V_{RP}$ (V) |
|---|---|---|---|
| Example 12 | −1025 | 2890 | 0 |
| Example 13 | −1110 | 2780 | 5 |
| Example 14 | −975 | 2750 | 0 |
| Example 15 | −1005 | 2750 | 0 |
| Example 16 | −1055 | 2790 | 0 |

As described above, the electrophotographic photoreceptor according to the present invention in which the specific polycarbonate resin is used as a binder resin exhibits higher sensitivity and lower residual potential as compared with the conventional photoreceptors using other binder resins. The photoreceptor of the present invention is therefore useful as a positively or negatively chargeable electrophotographic photoreceptor.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising a conductive support having thereon a photosensitive layer, wherein a charge transporting layer constituting said photosensitive layer or a protective layer formed on said photosensitive layer contains an electron transporting agent dissolved or dispersed in a polycarbonate resin containing a monomer unit represented by formula (I):

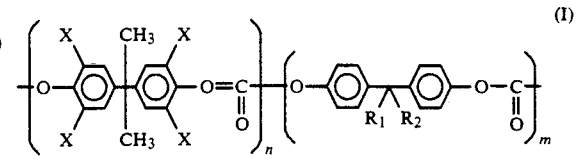

wherein $R_1$ represents a hydrogen atom, a methyl group, a cyano group, or a phenyl group; $R_2$ represents a methyl group, a cyano group, or a phenyl group; or $R_1$ and $R_2$ are connected to each other to form a 5- or 6-membered saturated ring; X represents a chlorine atom or a bromine atom; n represents an integer; and m represents 0 or an integer.

2. An electrophotographic photoreceptor as claimed in claim 1, wherein in formula (I) n is from 30 to 300, and m is from 0 to 300.

3. An electrophotographic photoreceptor as claimed in claim 1, wherein said polycarbonate resin has a weight-average molecular weight of from 15,000 to 200,000.

4. An electrophotographic photoreceptor as claimed in claim 1, wherein a mixing weight ratio of the charge transporting agent to the polycarbonate resin is from 1:20 to 20:1.

5. An electrophotographic photoreceptor as claimed in claim 1, wherein $R_1$ and $R_2$ each represent a methyl group or a phenyl group.

6. An electrophotographic photoreceptor as claimed in claim 1, wherein said electron transporting agent is selected from the group consisting of fluorenone compounds, benzophenone compounds, anthraquinone compounds, benzoquinone compounds, and 4H-thiopyran 1,1-dioxide compounds.

7. An electrophotographic photoreceptor as claimed in claim 1, wherein X is a bromine atom.

* * * * *

UNITED STATES PATENT AND TRADEMARK OFFICE
CERTIFICATE OF CORRECTION

PATENT NO. : 5,139,908
DATED : August 18, 1992
INVENTOR(S) : Yutaka Akasaki et al It is certified that error appears in the above-indentified patent and that said Letters Patent is hereby corrected as shown below:

Abstract, line 10, in the formula, change " $-O=C-$ " to -- $-O-\underset{\underset{O}{\|}}{C}-$ --.

Claim 1, column 18, line 61, in the formula, change " $-O=C-$ " to -- $-O-\underset{\underset{O}{\|}}{C}-$ --.

Signed and Sealed this

Twenty-sixth Day of October, 1993

Attest:

BRUCE LEHMAN

Attesting Officer   Commissioner of Patents and Trademarks